US010072591B2

(12) United States Patent
Schmitt et al.

(10) Patent No.: US 10,072,591 B2
(45) Date of Patent: Sep. 11, 2018

(54) METHOD AND DEVICE FOR OPERATING AN ELECTRICALLY OPERABLE COMPRESSOR OF A SUPERCHARGER

(71) Applicant: Robert Bosch GmbH, Stuttgart (DE)

(72) Inventors: Florian Schmitt, Winnenden (DE); Johannes-Joerg Rueger, Esslingen (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/234,105

(22) Filed: Aug. 11, 2016

(65) Prior Publication Data

US 2017/0058795 A1 Mar. 2, 2017

(30) Foreign Application Priority Data

Aug. 27, 2015 (DE) .................. 10 2015 216 377

(51) Int. Cl.
*F02D 41/00* (2006.01)
*F02B 37/10* (2006.01)
*F02B 39/10* (2006.01)

(52) U.S. Cl.
CPC .......... *F02D 41/0007* (2013.01); *F02B 37/10* (2013.01); *F02B 39/10* (2013.01); *F02D 41/0042* (2013.01); *F02D 41/0065* (2013.01); *F02D 2200/021* (2013.01); *F02D 2200/0418* (2013.01); *F02D 2200/503* (2013.01); *Y02T 10/144* (2013.01)

(58) Field of Classification Search
CPC ............. F02D 41/0007; F02D 41/0042; F02D 2200/0418; F02D 41/0065; F02D 2200/021; F02D 2200/503; F02B 39/10; F02B 37/10; Y02T 10/144
See application file for complete search history.

(56) References Cited

U.S. PATENT DOCUMENTS

| 4,450,814 A * | 5/1984 | Sawamoto | F02B 37/16 123/198 D |
|---|---|---|---|
| 6,595,183 B1 * | 7/2003 | Olofsson | F01L 1/34 123/315 |
| 2011/0072799 A1 * | 3/2011 | Bidner | F01N 3/023 60/286 |
| 2011/0209685 A1 * | 9/2011 | Shane | F02D 41/0002 123/299 |
| 2012/0191322 A1 * | 7/2012 | Garrard | F01M 1/20 701/103 |
| 2013/0090832 A1 * | 4/2013 | Bevan | F02B 37/04 701/102 |

(Continued)

FOREIGN PATENT DOCUMENTS

JP 2007040275 A * 2/2007
JP 4630755 B2 * 2/2011

*Primary Examiner* — Joseph Dallo
(74) *Attorney, Agent, or Firm* — Norton Rose Fulbright US LLP; Gerard Messina

(57) ABSTRACT

A method for operating a supercharger having an electrically operable compressor in an engine system having an internal combustion engine, having the following steps: determining a particular system state when the internal combustion engine is shut off; forming a purge path between an air supply system and an exhaust gas system of the engine system; activating the electrically operable compressor as a function of the determined system state.

20 Claims, 3 Drawing Sheets

(56) References Cited

U.S. PATENT DOCUMENTS

| | | | |
|---|---|---|---|
| 2013/0305709 A1* | 11/2013 | Rollinger | F02D 41/10 60/601 |
| 2013/0305714 A1* | 11/2013 | Rollinger | F02D 23/02 60/603 |
| 2013/0305715 A1* | 11/2013 | Rollinger | F02B 37/00 60/605.2 |
| 2013/0305716 A1* | 11/2013 | Rollinger | F02D 41/10 60/605.2 |
| 2013/0305718 A1* | 11/2013 | Rollinger | F02P 5/045 60/608 |
| 2015/0136074 A1* | 5/2015 | Styles | F02D 29/02 123/320 |
| 2015/0136076 A1* | 5/2015 | Styles | F02D 17/04 123/325 |
| 2016/0040616 A1* | 2/2016 | Dickson | F02D 41/022 701/54 |

* cited by examiner

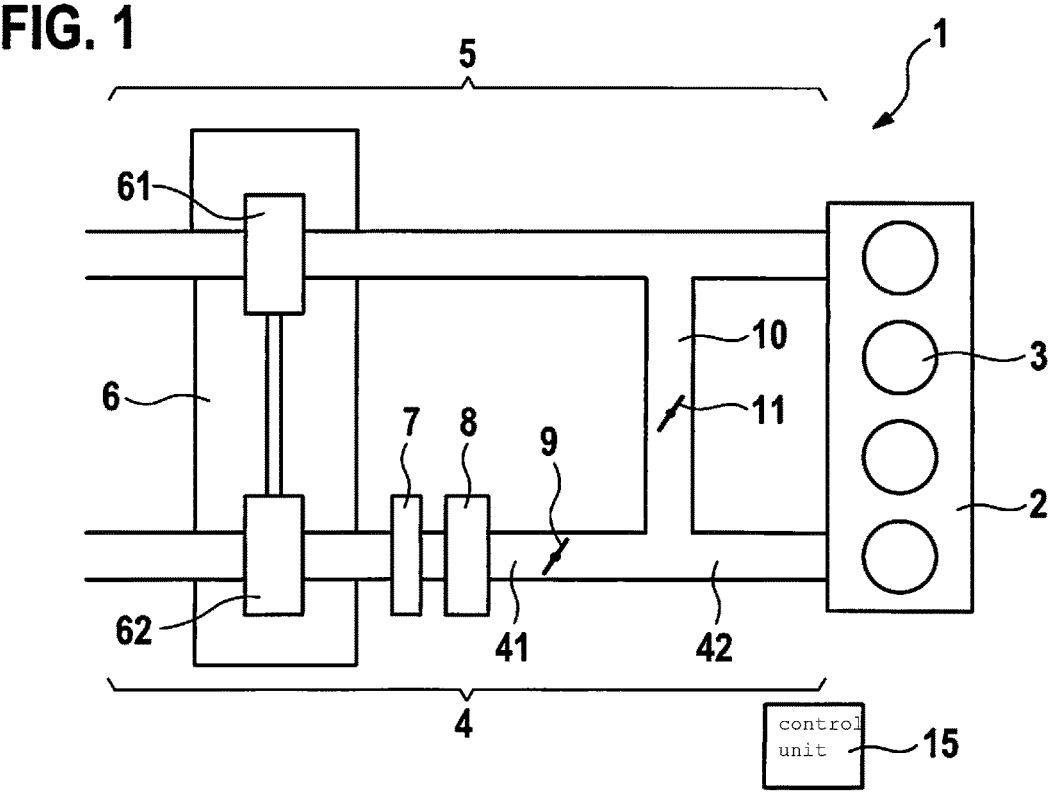
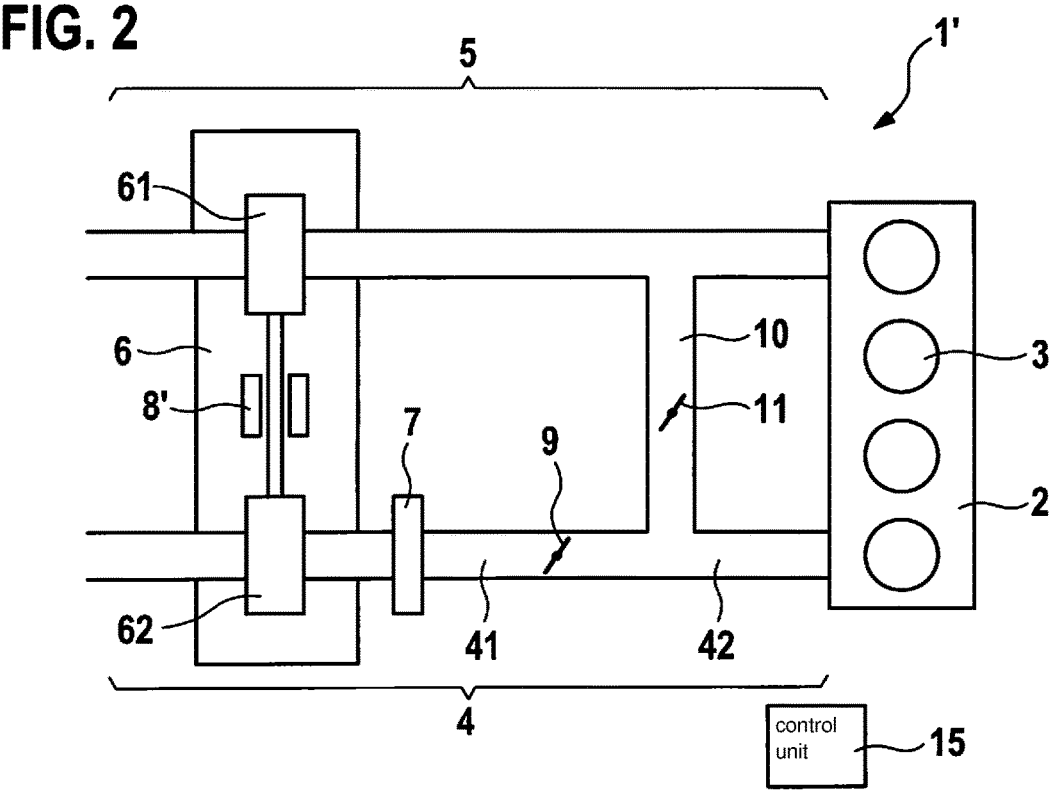

METHOD AND DEVICE FOR OPERATING AN ELECTRICALLY OPERABLE COMPRESSOR OF A SUPERCHARGER

CROSS REFERENCE

The present application claims the benefit under 35 U.S.C. § 119 of German Patent Application No. DE 102015216377.6 filed on Aug. 27, 2015, which is expressly incorporated herein by reference in its entirety.

FIELD

The present invention relates to supercharged internal combustion engines having electrically operable compressors. In particular, the present invention relates to methods for operating electrically operable compressors in supercharged internal combustion engines.

BACKGROUND INFORMATION

In the course of downsizing internal combustion engines having superchargers driven by exhaust gas, the effect of the dynamic startup lag of superchargers becomes stronger when there is a torque request; this is the so-called turbo lag. Therefore, a possible measure is to use electrically operable compressors instead of exhaust gas-driven superchargers, or to provide exhaust gas-driven superchargers with electrical supporting drives. Due to the standardly fast response time of the electrically operable compressors, the charge pressure buildup can be carried out significantly faster than is the case with purely exhaust gas-driven superchargers. The use of an electrically operable compressor permits a performance-focused design of the supercharging operation, so that a significant increase in the specific performance can be achieved.

The electrically operable compressor can be integrated into the charge air path downstream from the charge air cooler, so that the volume to be compressed after the electrically operable compressor is as small as possible.

In the case of exhaust gas-driven superchargers having integrated electrical support, so-called cross-chargers, the electrically operable compressor can be realized by an electrical support drive provided at the mechanical coupling between an exhaust gas turbine and compressor, so that in addition to or alternatively to the exhaust gas enthalpy converted into mechanical energy, electrical energy can also be provided to drive the compressor.

SUMMARY

According to the present invention, a method is provided for operating a supercharger having an at least partly electrically provided compressing performance, and a device and an engine system are provided.

According to a first aspect of the present invention, a method is provided for operating a supercharger having an electrically operable compressor in an engine system having an internal combustion engine, having the following steps:
  determining a particular system state when the internal combustion engine is shut off;
  forming a purge path between an air supply system and an exhaust gas system of the internal combustion engine;
  activating the electrically operable compressor as a function of the determined system state.

Both for the additional purely electrically operable compressor and for the exhaust gas-driven superchargers having electrical support (cross-chargers), it is possible to supply fresh air to the charge pressure segment and intake pipe segment of the internal combustion engine, independent of the provided exhaust gas enthalpy.

When shutting off the internal combustion engine, given high engine temperature and/or high coolant pressure in the coolant circuit of the internal combustion engine, as a rule an engine fan is activated in order to rapidly lower the temperature of the internal combustion engine. Depending on the duration of operation and combustion engine load before the shutting off, however, after shutting off the internal combustion engine a migration of the heat core into the cylinder head may occur. This process can, in some circumstances, last significantly longer than the previously standard afterrunning of the engine fan.

In addition, in vehicle engines the post-heating can cause fuel gas emissions in the fuel and/or injection system, making restarting of the internal combustion engine more difficult.

In addition, after shutting off the internal combustion engine, intake air or combustion exhaust gas that is warmer than the ambient temperature may remain in the air supply and/or exhaust gas system. Due to the cooling that then occurs, after shutting off the internal combustion engine there may occur precipitation of condensate from the intake air or combustion exhaust gas in the air supply and exhaust gas system. This can cause, for example in the air supply system, deposition of adhesive substances, for example on sensor elements, and can cause formation of acid-containing deposits in the exhaust gas system. These deposits can cause damage. In particular, the next time the engine is started the condensate in the air supply and exhaust gas system can be detached due to the suddenly occurring gas flow, and can cause damage to components positioned downstream (hydrostatic lock).

An idea of the above method is, in an engine system having a supercharged internal combustion engine in which at least a part of the compressor power can be provided by an electrically operable compressor, to activate the electrically operable compressor after shutting off the internal combustion engine if a system state is present in which there is a danger to the engine system due to overheating and/or due to the arising of a film of moisture and/or due to the settling of condensates or deposits. In this way, by producing excess pressure in the air supply system in the case of a purely electrically operable compressor, a purely electrically operable compressor provided in addition to an exhaust gas-driven supercharger, and an exhaust gas-driven supercharger having electrical support (cross-charger), or through production of a partial vacuum in the exhaust gas system in a cross-charger, a gas exchange with ambient air can be achieved in the air supply system and in the exhaust gas system.

This makes it possible, in an improved manner, to exchange the gases remaining in the air supply and exhaust gas system for ambient air, after shutting off the internal combustion engine. In this way, on the one hand heat from the components of the air supply system and the exhaust gas removal system can be quickly carried away through the exchange with the cooler ambient air. In addition, hydrostatic lock and/or adhesive condensates on components of the air supply system, and/or acid formations of condensates with exhaust gas components in the air supply system or in the exhaust gas system, can be reduced or prevented. In this way, component protection is improved, and the reliability of the sensors and actuators present in the air supply system and exhaust gas system can be maintained, and overall damaging corrosion can be avoided.

Depending on the construction, the possibility of electrically providing compressor performance enables a decoupling from the internal combustion engine operation, so that the corresponding compression performance can be provided both when the internal combustion engine is in operation and also when it is shut off, in addition to or independent of the compressor performance generated from the exhaust gas enthalpy.

In addition, the particular system state can be determined if at least one of the following conditions is met:
- at least one engine temperature is above a prespecified temperature threshold value;
- a moisture of a gas in the air supply system and/or in the exhaust gas system is above a prespecified moistness threshold value; and
- a cooling of a gas in the air supply system and/or in the exhaust gas system is above a prespecified temperature difference threshold value.

In particular, the electrically operable compressor can be activated for a prespecified time duration if a cooling of the gas in the air supply system and/or in the exhaust gas system is above a prespecified temperature difference threshold value, the prespecified time duration corresponding in particular to at least a time duration that is sufficient for a purging of the air supply system and of the exhaust gas system.

In addition, the electrically operable compressor can be deactivated as a function of the determined system state, or a further determined system state.

It can be provided that the activation and the deactivation of the electrically operable compressor is carried out multiple times, in particular cyclically.

According to a specific embodiment, a purge path can be formed by opening a throttle valve and by opening an exhaust gas recirculation valve.

It can be provided that a purge path can be formed by opening a throttle valve in the air supply system, an inlet valve and an outlet valve at one of the cylinders of the internal combustion engine.

In addition, an activation of the electrically operable compressor can be permitted or suppressed as a function of a charge state of an electrical energy storage device that operates the electrically operable compressor.

According to a further aspect, a device, in particular a control unit, is provided that is fashioned to carry out the above method.

According to a further aspect, an engine system is provided, including:
- an internal combustion engine to which ambient air is supplied via an air supply system and from which combustion exhaust gas is conducted away via an exhaust gas system;
- an electrically operable compressor;
- the above device.

In addition, the electrically operable compressor can be provided in addition to an exhaust gas-driven supercharger, or can be formed by electromotoric support of the compressor of the exhaust gas-driven supercharger.

BRIEF DESCRIPTION OF THE DRAWINGS

Below, specific embodiments are explained in more detail on the basis of the figures.

FIG. 1 shows a schematic representation of an engine system having an exhaust gas-driven supercharger and an additional purely electromotorically operable compressor.

FIG. 2 shows a schematic representation of a further engine system having an exhaust gas-driven supercharger having an electromotorically operable compressor.

DETAILED DESCRIPTION OF EXAMPLE EMBODIMENTS

Figure 3:
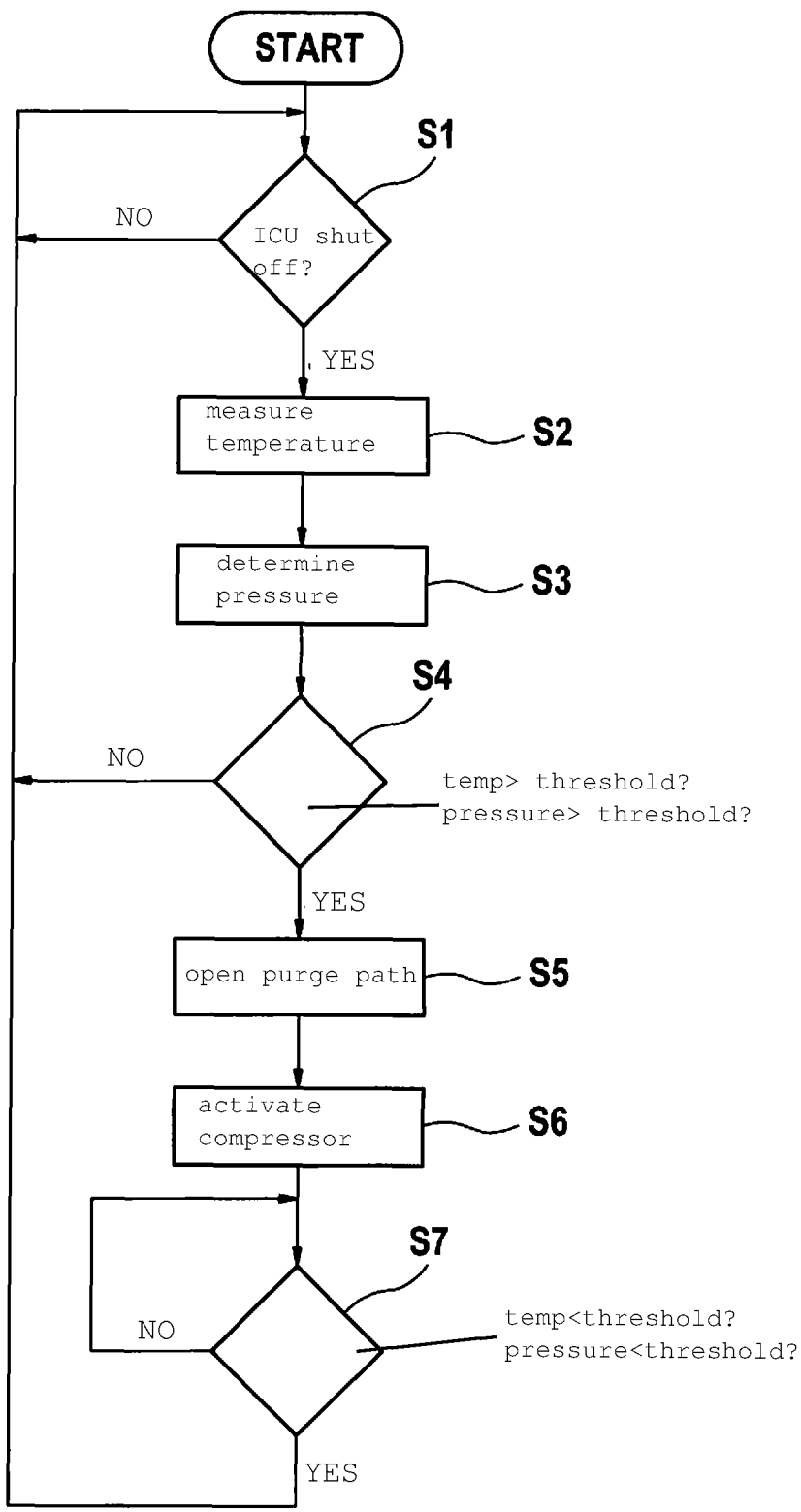
FIG. 3 shows a schematic representation of a flow diagram illustrating a method for operating an electrically supported supercharging.

FIG. 1 shows an engine system 1 having an internal combustion engine 2 that has a number of cylinders 3. In the present exemplary embodiment, four cylinders 3 are provided, without limitation of generality. Internal combustion engine 2 can be fashioned as a diesel engine or as a spark-ignition engine.

In a conventional manner, ambient air is supplied to internal combustion engine 2 via an air supply system 4, and combustion exhaust gas is carried off from cylinders 3 via an exhaust gas system 5. Air supply system 4 is connected to cylinders 3 of internal combustion engine 2 in a known manner via inlet valves (not shown). Combustion exhaust gas is expelled into exhaust gas system 5 in a known manner via corresponding outlet valves (not shown).

A supercharger 6 can be provided that has an exhaust gas turbine 61 in the exhaust gas system 5 and a compressor 62 in air supply system 4. Turbine 61 is mechanically coupled to compressor 62, so that exhaust gas enthalpy, which is converted into mechanical energy in turbine 61, is used to compress ambient air taken from the surrounding environment in compressor 62.

A charge air cooler 7 can be provided downstream from compressor 62. Downstream from charge air cooler 7, an additional compressor 8, purely electrically operable, can be provided in order to provide charge air under charge pressure in an intake pipe segment 41 of air supply system 4. The charge pressure in charge air segment 41 results from the compression performance of compressor 62 and of the additional purely electrically operable compressor 8.

Charge air segment 41 is limited downstream by a throttle valve 9. Between throttle valve 9 and inlet valves (not shown) of cylinders 3 of internal combustion engine 2, there is situated an intake pipe segment 42 of air supply system 4.

Between a segment of exhaust gas system 5 situated between outlet valves (not shown) of cylinders 3 of internal combustion engine 2 and turbine 61, an exhaust gas recirculation line 10 leads into intake pipe segment 42. In exhaust gas recirculation line 10, there can be situated an exhaust gas recirculation valve 11, in order to make it possible to adjust the level of the recirculated exhaust gas mass flow.

A control unit 15 is provided that operates internal combustion engine 2 in a conventional manner, by setting the actuators, such as throttle valve 9, a charge actuator on turbine 61 (not shown), exhaust gas recirculation valve 11, and the like, corresponding to a momentary operating state of internal combustion engine 2 and corresponding to a specification, for example a torque requested by the driver.

FIG. 2 shows an alternative engine system 1'. Identical components, or components having identical function, are provided therein with identical reference characters. Differing from engine system 1, in engine system 1' no additional purely electrically operable compressor is provided. Instead, the electrically operable compressor is provided with the aid of a support drive 8' in supercharger 6, which can bring in additional mechanical energy via the mechanical coupling between turbine 61 and compressor 62, so that compressor 62 can also be operated independent of mechanical energy provided by the turbine. In the specific embodiment of FIG. 2, the electrically operable compressor is formed from support drive 8' and compressor 62.

In an alternative specific embodiment, the engine system does not have an exhaust gas-driven supercharger, but rather has only an electrically operable compressor.

In FIG. 3, an operating method is shown for operating an electrically operable compressor according to one of the specific embodiments described above, on the basis of a flow diagram.

In step S1, it is checked whether internal combustion engine 2 has been shut off. If this is the case (alternative: yes), the method continues with step S2; otherwise, the method jumps back to step S1.

In step S2, an engine temperature in the internal combustion engine is measured. The engine temperature to be measured can for example be a coolant temperature and/or a combustion web temperature or the like.

In addition, in step S3 a pressure (not shown) in the cooling system of internal combustion engine 2 can optionally be determined.

In step S4, it is now checked whether the engine temperature exceeds a prespecified temperature threshold value, and/or whether the pressure in the cooling system exceeds a prespecified pressure threshold value. If this is the case (alternative: yes), the method continues with step S5; otherwise the method jumps back to step S1.

In step S5, a purge path is now opened in order to flush ambient air via air supply system 4 into exhaust gas system 5, using the electrically operable compressor, so that a cooling is achieved of the components situated in the exhaust gas system or thermally connected therewith.

A purge path is formed by opening a flow channel between air supply system 4 and exhaust gas system 5. The opening of a purge path can for example be achieved by opening exhaust gas recirculation valve 11, so that the suctioned ambient air is conducted into exhaust gas system 5 via the intake pipe segment and exhaust gas recirculation line 10.

Alternatively or in addition, in at least one of the cylinders 3 an inlet valve and an outlet valve can simultaneously be in the open position, so that ambient air can be conducted into exhaust gas system 5 via intake pipe segment 42 through the relevant cylinder 3 of internal combustion engine 2. The simultaneous positioning of the inlet and outlet valves in the open position can for example be achieved through a corresponding setting with variable valve drives (e.g., with a camshaft phase actuator and the like). In particular, when internal combustion engine 2 is shut off, these can deliberately be set in the engine runout in such a way that a purge path is opened through one of cylinders 3.

In engine systems that additionally have a low-pressure exhaust gas recirculation line, it can also be provided to flush the ambient air that is to be conducted by opening a corresponding low-pressure exhaust gas recirculation valve.

In step S6, a electrically operable compressor 8 is now activated in order to flush ambient air through air supply system 4 and through exhaust gas system 5.

Electrically operable compressor 8 can remain activated as long as the engine temperature does not fall below the temperature threshold value, or a further prespecified temperature threshold value, and/or the pressure in the cooling system does not fall below the prespecified pressure threshold value, or a further prespecified pressure threshold value. This query is carried out in step S7. Only when the engine temperature falls below the prespecified temperature threshold value, or a further prespecified temperature value, and/or the pressure in the cooling system falls below the prespecified pressure threshold value, or a further prespecified pressure threshold value, is the electrically operable compressor deactivated, and the method continues with step S1.

The method can be carried out cyclically, i.e., can be repeated at determinate time intervals.

In addition, by checking a battery charge state an activation of the electrical compressor support can be prevented if the battery charge state falls below a particular value.

Figure 4:
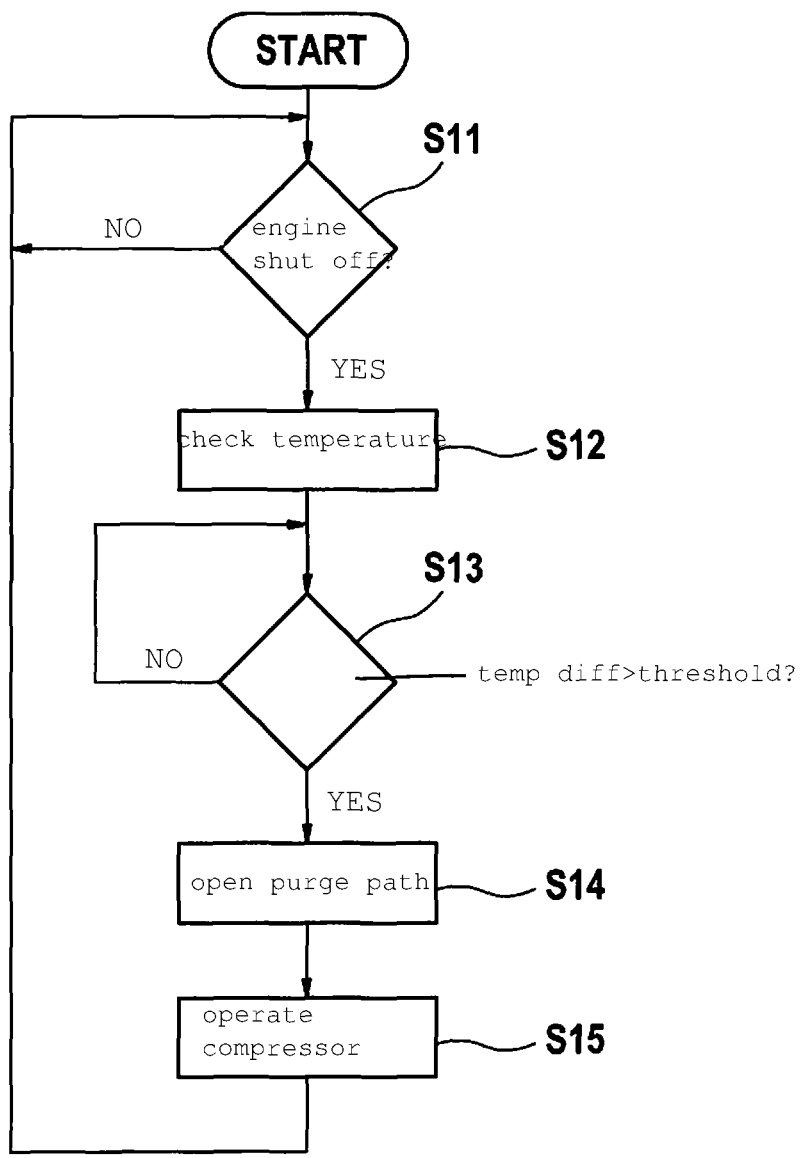
FIG. 4 shows a schematic representation of a flow diagram illustrating a further method for operating an electrically supported supercharging.

FIG. 4 shows a further operating method for operating a electrically operable compressor according to one of the above-described specific embodiments, on the basis of a flow diagram.

In step S11 it is checked whether internal combustion engine 2 has been shut off. If this is the case (alternative: yes), the method is continued with step S12; otherwise the method jumps back to step S1.

In step S12, the temperature indications from air supply system 4 and/or exhaust gas system 5 are continuously or periodically stored and are continuously checked in a query step S13 if, during the cooling off, the temperature difference or temperature differences, when the electrically operable compressor is deactivated, has respectively exceeded a particular temperature difference threshold value.

If in step S13 it is determined that at least one temperature difference has exceeded a specified temperature difference threshold value (alternative: yes), then in step S14 at least one air purge path is opened, as described above.

In step S15, electrically operable compressor 8' is now activated in order to flush ambient air through air supply system 4 and exhaust gas system 5. In this way, ambient air is flushed through air supply system 4 and exhaust gas system 5, and in this way expels condensate, deposits, and condensed-out gases to the surrounding environment. In addition, the cooler ambient air thereby suctioned in can absorb more moisture due to the warming in air supply system 4 or exhaust gas system 5.

The method can be carried out cyclically, i.e., can be repeated at determinate time intervals.

In addition, by checking a battery charge state, an activation of the electrical compressor support can be prevented if the battery charge state falls below a particular value.

After a prespecified time duration after the switching on of electrically operable compressor 8', this compressor can be deactivated again. The prespecified time duration can be regulated such that it is ensured that a complete exchange of the gases situated in air supply system 4 and exhaust gas removal system 5 for ambient air has taken place.

The method can be repeated, through periodic or cyclical activation, until the temperature of the air remaining in air supply system 4 or exhaust gas system 5 is lower than a prespecified residual temperature threshold value.

Alternatively or in addition, in engine systems in which a moisture of the gas situated in air supply system 4 and/or in exhaust gas system 5 is acquired, measured, or determined, through activation of the electrically operable compressor ambient air can be conducted through the purge path if a particular moisture threshold value has been reached or exceeded. If the particular moisture threshold value, or a further particular moisture threshold value, is fallen below, the electrically operable compressor can be deactivated again.

The above methods for operating the electrically operable compressor after a shutting off of engine system 1, 1' can be carried out alternatively or in combination with one another.

What is claimed is:

1. A method for operating a supercharger having an electrically operable compressor in an engine system having an internal combustion engine, comprising:
   determining a particular system state when the internal combustion engine is shut off;
   while the internal combustion engine is shut off, forming a purge path between an air supply system of the engine system and an exhaust gas system of the engine system; and
   while the internal combustion engine is shut off and after the purge path is formed, activating the electrically operable compressor, as a function of the determined system state, to flush ambient air through the air supply system and through the exhaust gas system using the purge path.

2. The method as recited in claim 1, wherein the particular system state is determined if at least one of the following conditions is met:
   at least one engine temperature is above a prespecified temperature threshold value; and
   a moisture of a gas at least one of: in the air supply system, and in the exhaust gas system, is above a prespecified moistness threshold value
   a temperature difference between temperatures of a gas in at least one of: in the air supply system, and in the exhaust gas system, as the gas is cooling is above a prespecified temperature difference threshold value.

3. The method as recited in claim 1, wherein the electrically operable compressor is activated for a prespecified time duration if a temperature difference between temperature of the gas at least one of: in the air supply system, and in the exhaust gas system, as the gas is cooling is above a prespecified temperature difference threshold, the prespecified time duration corresponding to at least a time duration for a complete purging of the air supply system and the exhaust gas system.

4. The method as recited in claim 1, wherein after the electrically operable compressor is activated, the electrically operable compressor is deactivated as a function of the determined system state or of a further determined system state.

5. The method as recited in claim 4, wherein the activation and deactivation of the electrically operable compressor is being carried out multiple times, cyclically.

6. The method as recited in claim 1, wherein the purge path is formed by opening a throttle valve and by opening an exhaust gas recirculation valve.

7. The method as recited in claim 1, wherein the purge path is formed by opening a throttle valve in the air supply system, an inlet valve and an outlet valve at one of the cylinders of the internal combustion engine.

8. The method as recited in claim 1, wherein an activation of the electrically operable compressor is being allowed or suppressed as a function of a charge state of an electrical energy storage device that operates the electrically operable compressor.

9. A control unit to operate a supercharger having an electrically operable compressor in an engine system having an internal combustion engine, the control unit designed to:
   determine a particular system state when the internal combustion engine is shut off;
   form a purge path between an air supply system and an exhaust gas system of the engine system while the internal combustion engine is shut off; and
   activate the electrically operable compressor, as a function of the determined system state, to flush ambient air through the air supply system and through the exhaust gas system using the purge path while the internal combustion engine is shut off and after the purge path is formed.

10. An engine system, comprising:
    an internal combustion engine to which ambient air is supplied via an air supply system, and from which combustion exhaust gas is carried away via an exhaust gas system;
    an electrically operable compressor; and
    a control unit designed to determine a particular system state when the internal combustion engine is shut off, form a purge path between an air supply system and an exhaust gas system of the engine system while the internal combustion engine is shut off, and activate the electrically operable compressor as a function of the determined system state, while the internal combustion engine if shut off and after the purge path is formed, to flush ambient air through the air supply system and through the exhaust gas system using the purge path.

11. The engine system as recited in claim 10, wherein one of: the electrically operable compressor being provided in addition to an exhaust gas-driven supercharger, the electrically operable compressor being formed by electromotoric support of a compressor of the exhaust gas-driven supercharger.

12. A non-transitory machine-readable storage medium on which is stored a computer program for operating a supercharger having an electrically operable compressor in an engine system having an internal combustion engine, the computer program, when executed by a control using, causing the control unit to perform:
    determining a particular system state when the internal combustion engine is shut off;
    while the internal combustion engine is shut off, forming a purge path between an air supply system of the engine system and an exhaust gas system of the engine system; and
    while the internal combustion engine is shut off and after the purge path is formed, activating the electrically operable compressor as a function of the determined system state, to flush ambient air through the air supply system and through the exhaust gas system using the purge path.

13. The method as recited in claim 1, wherein the purge path is formed by opening a flow channel between the air supply system and the exhaust gas system, the flow channel connecting a segment of an air intake pipe between the electrically operable compressor and the internal combustion engine, with a segment of the exhaust gas system.

14. The control unit as recited in claim 9, wherein the purge path is formed by opening a flow channel between the air supply system and the exhaust gas system, the flow channel connecting a segment of an air intake pipe between the electrically operable compressor and the internal combustion engine, with a segment of the exhaust gas system.

15. The engine system as recited in claim 10, wherein the purge path is formed by opening a flow channel between the air supply system and the exhaust gas system, the flow channel connecting a segment of an air intake pipe between the electrically operable compressor and the internal combustion engine, with a segment of the exhaust gas system.

16. The non-transitory machine-readable storage medium as recited in claim 12, wherein the purge path is formed by opening a flow channel between the air supply system and the exhaust gas system, the flow channel connecting a segment of an air intake pipe between the electrically operable compressor and the internal combustion engine, with a segment of the exhaust gas system.

17. The method as recited in claim 13, wherein the segment of the exhaust gas system is between the internal combustion engine and an exhaust gas turbine.

18. The control unit as recited in claim 14, wherein the segment of the exhaust gas system is between the internal combustion engine and an exhaust gas turbine.

19. The system as recited in claim 15, wherein the segment of the exhaust gas system is between the internal combustion engine and an exhaust gas turbine.

20. The non-transitory machine-readable storage medium as recited in claim 16, wherein the segment of the exhaust gas system is between the internal combustion engine and an exhaust gas turbine.

* * * * *